W. J. Lippincott,

Grinding and Polishing Saws.

No. 3,147. Reissued Oct. 6, 1868.

Witnesses:

F. M. Magee

Jas. V. Hana

Inventor:

Wm. J. Lippincott by his attorney

N. Bakewell

United States Patent Office.

JOHN LIPPINCOTT, THOMAS BAKEWELL, BENJAMIN P. BAKEWELL, AND BENJAMIN BAKEWELL, JR., OF PITTSBURG, PENNSYLVANIA, ASSIGNEES OF WILLIAM J. LIPPINCOTT.

*Letters Patent No.* 50,606, *dated October* 24, 1865; *reissue No.* 3,147, *dated October* 6, 1868.

IMPROVEMENT IN MACHINE FOR GRINDING AND POLISHING SAWS.

The Schedule referred to in these Letters Patent and making part of the same.

TO ALL WHOM IT MAY CONCERN:

Be it known that WILLIAM J. LIPPINCOTT, assignor to JOHN LIPPINCOTT, THOMAS BAKEWELL, BENJAMIN P. BAKEWELL, and BENJAMIN BAKEWELL, Jr., partners, under the firm of LIPPINCOTT & BAKEWELL, of the city of Pittsburg, in the county of Allegheny, and State of Pennsylvania, has invented a new and useful Improvement in Machines for Grinding and Polishing Saws, which is also applicable to grinding and polishing sheets or plates of steel or other metals; and we, the said assignees, do hereby declare the following to be a full, clear, and exact description thereof, reference being had to the annexed drawing, forming part of this specification, in which—

Figure 1:
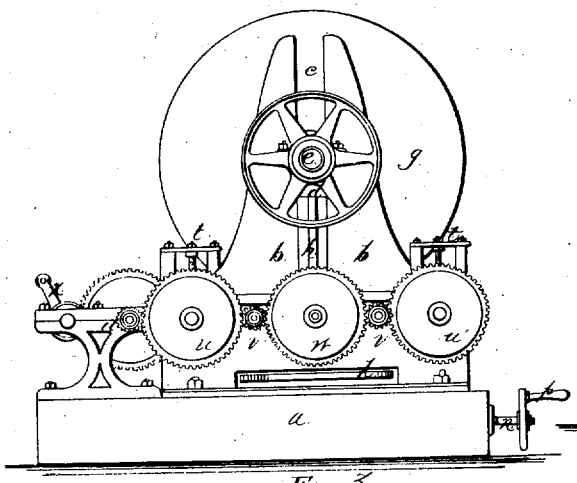
Figure 1 is a side elevation of his machine, viewed from the right-hand side.

Previous to the introduction of the invention hereinafter described, the ordinary mode of grinding and polishing long saws was to press them by hand on the periphery of a grindstone, which revolved rapidly by machinery, the saw being moved along over the stone by the workman as the grinding progressed, the degree of pressure of the saw on the stone being regulated by the operator bearing down with more or less of the weight of his body upon the saw.

This mode of operation was liable to many serious objections. The grindstones not being of uniform hardness throughout, tended naturally to wear away more rapidly at the soft places than elsewhere, and, as the saw was laid upon the stone, and pressed down upon it, the stone very soon acquired an uneven surface, the hard places projecting beyond its surface, where the stone was more abraded.

As soon as this inequality increased so as to impair the accurate rotundity of the stone to any considerable degree, it became necessary to chip off the hard projections, and dress down the stone to a true circle, which caused a great waste of the stone, and considerable expense and loss of time.

Another mode of grinding saws was to place them on a horizontal table or bed, to which the saw was secured by pins or clamps, the bed and saw traversing back and forth under the grindstone, which revolved on its axis above it.

This mode had also serious objections, the chief of which were the impossibility of moving the saw sideways under the stone, according as the back or edge needed most grinding, and the trouble of securing the saw-plate to the bed, and removing it when it is required to be turned, the rising of the saw from the bed or table during the process of grinding, caused by its elongation from the heat created by the friction of the stone, and its being confined by clamps at the ends, and the uneven surface produced by the sand washed from the stone getting between the bed-plate and the saw. It was almost impossible, in practice, to keep the bed or table so accurately horizontal and perfectly level as that the distance between the grinding-surface of the stone and the bearing-point of the table (which was constantly changing) should be so entirely uniform that there should be no perceptible variation in the thickness of a long saw-plate.

By both of these methods it was, and still is, very difficult to make the saws of uniform thickness throughout their entire length, whereas uniformity of gauge is a very important desideratum; and, as cast-steel saw-plates are almost invariably thicker at one end than at the other, before being manufactured into saws, it is a matter of great nicety not only to remove the scale and polish the metal, but also to grind it down to a uniform gauge By the machine hereinafter described, all these difficulties are effectually overcome, and not only is the work of grinding and polishing saws performed much more expeditiously than by the old process, and a great saving in the grindstones effected, and uniformity of gauge secured, but also the gauge is regulated to any required thickness of plate, and the saw so ground as to reduce its thickness at the back more than at the teeth, so as to give it clearance, and prevent friction in the use of the saw.

These important results are accomplished chiefly by using a rest, or bearing-roller or support, preferably of comparatively small diameter, so as to give a small bearing-surface, said roller or support having its axis in the same vertical plane as that of the grindstone, whereby is secured a bearing-surface which, if the roller be accurately cylindrical, is unvarying in its distance from and parallelism with or inclination to the surface of the grindstone, and which, as it constantly revolves, is kept free from the accumulation of sand by the water always used in the operation of grinding.

To enable others skilled in the art to construct and use this improved machine, we will proceed to describe its construction and operation.

In the drawing—

*a* is the rectangular frame or bed of the machine, from the opposite sides of which rise two strong standards, *b b'*, each of which has a vertical slit, *c*, extending from the top downwards a sufficient distance so as to raise and lower the pillar-blocks *d d'*, or boxes which carry the journals *e e'* of the shaft *f*, to which the grindstone *g* is secured.

The journal-boxes *d d'* are made with a deep groove on each side, to receive the face of the standards *b b'*, on each side of the slit *c*, so that one journal-box, *d*, may slide up and down in the slit of each standard *b*, as between ways.

The grindstone-shaft *f* is placed horizontally across the machine, between the journal-boxes *d d'*, in which it revolves, and the grindstone is attached to the shaft *f* midway between the standards *b b'*, at about the centre of the machine.

The grindstone is circular, with a plane face or periphery parallel to the axis of the shaft *f*. The journal-boxes carrying the grindstone are each attached to and supported by an upright iron rod, *h*, placed in the centre of the slit *c*, in which slides the journal-box, to which rod it is attached at its upper end by a pin, *i*.

Figure 2:
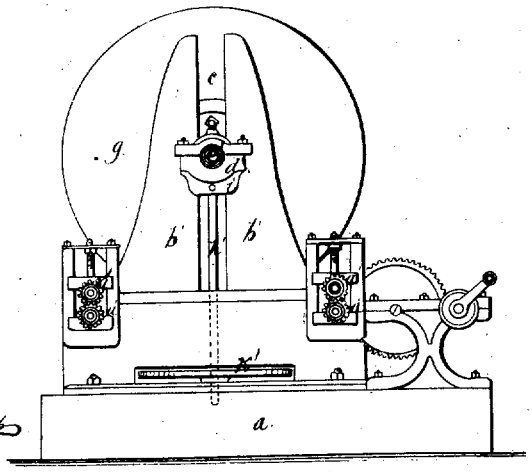
Figure 2 is a side elevation, viewed from the left-hand side.
Figure 3:
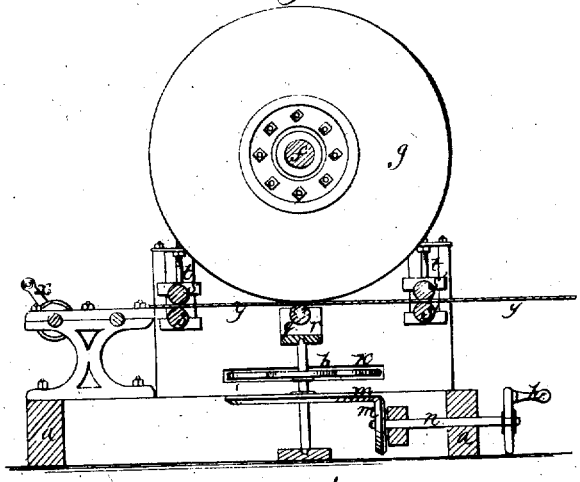
Figure 3 is a longitudinal vertical section of his machine through the centre thereof.
Figure 4:
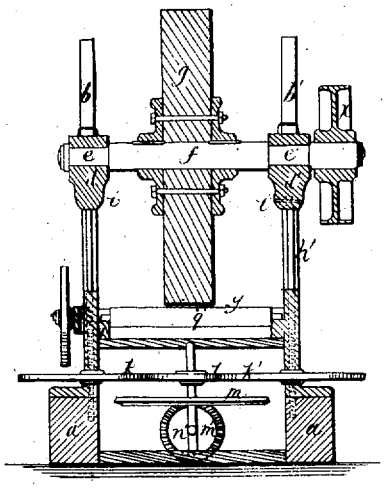
Figure 4 is a transverse vertical section of his machine through $x\ x$, fig. 1.

The lower part of each rod *h* has a screw cut in it, which takes into a female screw in the centre of a large cog-wheel, *k*, one such cog-wheel *k* being connected with each rod, *h*, and the central part of the cog-wheels *k k'*, resting upon their respective standards *b b'*, as seen in figs. 2 and 4, sustain the weight of the grindstone. The cog-wheels project each through a narrow opening made for that purpose, near the base of its standard.

The two cog-wheels *k k'* are on the same horizontal plane, and between them, connecting them together, so as to cause them to rotate in the same direction, is a pinion, *l*. The cog-wheels *k k'* being of the same diameter, and the pitch of the screws on the rods *h h'* being equal, the turning of the cog-wheels *k k'* by the pinion *l* causes the rods *h h'* to rise or descend equally, thus raising or lowering the journal-blocks *d d'* uniformly, and preserving the exact horizontal position of the grindstone-shaft, which is elevated or depressed by turning the pinion *l*.

The revolution of the pinion *l*, in either direction, is effected by the bevel-wheels *m m'*, one attached to the shaft of the pinion *l*, and the other to a horizontal shaft, *n*, which terminates at the rear end of the machine, in a crank, *p*.

Immediately under the axis of the grindstone, and parallel with the shaft *f*, is a horizontal cylindrical roller or support, *q*, which extends across the machine, its journals resting on blocks *r r'*, projecting from the inside of the standards *b b'*, (see fig. 4.)

This roller has no other motion than that on its axis, caused by the passage of the saw over it, and serves as a rest or support for the saw-plate, sustaining the pressure of the grindstone upon the saw, the degree of which is regulated by the depression of the journal-boxes *d d'*, in the manner described.

At a suitable distance in front and rear of the rest or roller, *q*, are placed a pair of horizontal friction feed-rollers, *s s s' s'*, the pressure of which is regulated by the set-screws *t t'* so as to suit different thicknesses of steel plate.

The upper surface of the lower feed-roll of each set is in the same horizontal plane as the upper surface of the rest-roller or support *q*, under the grindstone, so as to keep the saw perfectly straight.

The lower roll of each pair of friction-rolls has a cog-wheel, *u u'*, attached to its axis, and these are connected together by a train of pinions, *v v*, and cog-wheel *w*, so as to cause them to revolve in the same direction and with the same speed, a regular motion being communicated to them by the crank *x*.

The two friction-rollers *s s*, in each set, are geared together by pinions *a'*.

The operation of this machine is as follows:

The grindstone is adjusted to the proper height, so that its periphery, as it revolves over the rest-roller *q*, will touch and grind the saw-plate, (marked *y* in the drawing,) which adjustment is effected by turning the crank *p*, so as to raise or lower the stone. The grindstone is caused to revolve by power applied to the pulley *x*, on the shaft *f*. The feed-rollers *s s s' s'* are set in motion by the crank *x* and train of gearing-wheels, and revolve in such a direction as to cause the saw to pass forward, while the grindstone revolves in contact with it in the opposite direction.

As the centre of motion of the grindstone is fixed, its shaft, *f*, being held in the position in which it was set by the rods *h h'*, the grindstone will wear uniformly at all points, which would not be the case if it rested on the saw with its bearings loose, so that it could rise and fall.

As the stone gradually wears away, the bearings of the journals of the shaft *f* are lowered, by turning the rods *h h'*, by means of the crank *p*.

If it is desired to grind down the back of the saw-plate thinner than the teeth, it may be done by giving the rest or support *q* a slight inclination. If preferred, the support *q*, instead of turning freely in its bearings, may be attached to the cog-wheel *w*, forming one of the train of wheels connected with the feed-rollers *s s s' s'*, in which case it will revolve with them, and should then be of the same diameter.

The position of the rest or support *q*, under the grindstone *g*, and with its axis in the same vertical plane as the axis of the grindstone-shaft *f*, in connection with the mode of hanging the stone and elevating and depressing it, enables us to make an aperture or passage of any required depth, to which any metallic plate passed between the stone and the rest is made to conform, the stone reducing it to the gauge thus established.

This apparatus may be used for grinding and polishing not only long saws, but other sheets or plates of steel, or other metal which requires to be dressed and polished.

Having thus described this improved machine for grinding and polishing saws, what we claim as new, and as the invention of WILLIAM J. LIPPINCOTT, and desire to secure by Letters Patent, is—

A machine for grinding and polishing long saws, consisting of a grindstone, supported on adjustable bearings, so as to be raised or lowered at pleasure, in the manner described, and having a cylindrical support for the saw-plate to rest upon as it is being ground, the axis of which is in the same vertical plane as that of the grindstone, and with one or more pairs of feed-rollers, having pressure-screws, or their equivalent, so as to hold and guide the saw in its passage under the stone, such feed-rollers being geared so as to have a positive and continuous motion on their axes in such direction as to feed the saw-plate forward either with or against the motion of the revolving grindstone, substantially in the manner and for the purposes hereinbefore set forth.

In testimony whereof, we have hereunto set our hands.

JOHN LIPPINCOTT.
THOS. BAKEWELL.
BENJ. P. BAKEWELL.
B. BAKEWELL, JR.

Witnesses:
B. B. KERR,
WM. N. HOWARD.
G. H. CHRISTY.